(12) United States Patent
Wicki et al.

(10) Patent No.: US 9,135,175 B2
(45) Date of Patent: Sep. 15, 2015

(54) DISTRIBUTED CACHE COHERENCY DIRECTORY WITH FAILURE REDUNDANCY

(71) Applicant: Oracle International Coporation, Redwood City, CA (US)

(72) Inventors: Thomas M Wicki, Palo Alto, CA (US); Stephen E Phillips, Los Gatos, CA (US); Nicholas E Aneshansley, Poway, CA (US); Ramaswamy Sivaramakrishnan, San Jose, CA (US); Paul N Loewenstein, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 217 days.

(21) Appl. No.: 13/758,491

(22) Filed: Feb. 4, 2013

(65) Prior Publication Data
US 2014/0181420 A1     Jun. 26, 2014

Related U.S. Application Data

(60) Provisional application No. 61/745,122, filed on Dec. 21, 2012.

(51) Int. Cl.
*G06F 12/08* (2006.01)
*G06F 11/07* (2006.01)

(52) U.S. Cl.
CPC ............ *G06F 12/0831* (2013.01); *G06F 11/07* (2013.01); *G06F 12/0824* (2013.01)

(58) Field of Classification Search
CPC . G06F 12/0831; G06F 11/07; G06F 12/0824; G06F 12/0815; G06F 12/0817
See application file for complete search history.

(56) References Cited

U.S. PATENT DOCUMENTS

| | | | | |
|---|---|---|---|---|
| 5,247,648 | A * | 9/1993 | Watkins et al. | 711/143 |
| 6,012,127 | A * | 1/2000 | McDonald et al. | 711/141 |
| 6,073,216 | A * | 6/2000 | McDonald et al. | 711/141 |
| 6,633,960 | B1 | 10/2003 | Kessler et al. | |
| 6,918,015 | B2 | 7/2005 | Kessler et al. | |
| 7,290,260 | B2 * | 10/2007 | Miller | 718/104 |

(Continued)

OTHER PUBLICATIONS

International Search Report and Written Opinion from PCT/US2013/075622, mailed Apr. 9, 2014, pp. 1-9.

(Continued)

*Primary Examiner* — Cheng-Yuan Tseng
*Assistant Examiner* — Francisco Grullon
(74) *Attorney, Agent, or Firm* — Meyertons Hood Kivlin Kowert & Goetzel; Erik A. Heter

(57) ABSTRACT

A system includes a number of processors with each processor including a cache memory. The system also includes a number of directory controllers coupled to the processors. Each directory controller may be configured to administer a corresponding cache coherency directory. Each cache coherency directory may be configured to track a corresponding set of memory addresses. Each processor may be configured with information indicating the corresponding set of memory addresses tracked by each cache coherency directory. Directory redundancy operations in such a system may include identifying a failure of one of the cache coherency directories; reassigning the memory address set previously tracked by the failed cache coherency directory among the non-failed cache coherency directories; and reconfiguring each processor with information describing the reassignment of the memory address set among the non-failed cache coherency directories.

20 Claims, 4 Drawing Sheets

(56) References Cited

U.S. PATENT DOCUMENTS

| | | | |
|---|---|---|---|
| 8,392,661 | B1 | 3/2013 | Metcalf |
| 8,543,771 | B1 | 9/2013 | James |
| 2002/0133735 | A1* | 9/2002 | McKean et al. .................. 714/5 |
| 2002/0194429 | A1* | 12/2002 | Chiu et al. .................. 711/118 |
| 2003/0028819 | A1* | 2/2003 | Chiu et al. ........................ 714/5 |
| 2005/0240736 | A1* | 10/2005 | Shaw ............................ 711/146 |

OTHER PUBLICATIONS

TIBCO Software Inc., "Characterisitics of a Distributed Caching Scheme", Sep. 10, 2012, pp. 1-3.

ScaleOut Software, In-Memory Data Grids for the Enterprise, Sep. 10, 2012, pp. 1-7.

The Architecture Journal, "Caching in the Distributed Environment", Abhijit Gadkari, Sep. 10, 2012, pp. 1-13.

InterSystems Developer Connection, "Allocating Cache Shared Memory on Windows", Ray Fucillo, Mar. 8, 2012, pp. 1-4.

Silverton Consulting Inc., "EMC VPLEX Solutions for Local and Distributed Federation", 2010, pp. 1-5.

Nikhil Chandhok, "Web Distribution Systems : Caching and Replication", Feb. 7, 2000, pp. 1-22.

* cited by examiner

DISTRIBUTED CACHE COHERENCY DIRECTORY WITH FAILURE REDUNDANCY

PRIORITY INFORMATION

This invention claims priority to U.S. provisional patent application Ser. No. 61/745,122, entitled "DISTRIBUTED CACHE COHERENCY DIRECTORY WITH FAILURE REDUNDANCY", filed Dec. 21, 2012.

BACKGROUND

1. Technical Field

This disclosure relates to cache coherency directories and, more particularly, to methods, systems, and products for use in cache coherent systems.

2. Description of the Related Art

In a multi-processor system in which each processor shares memory, a cache coherency scheme may be implemented. In such a scheme, a directory may be employed to track accesses to the coherent cache lines. Such a directory may be implemented in a distributed manner, with multiple portions of the directory being implemented as separate components of the multi-processor system. In such example systems of the prior art, however, the failure of such a component renders the entire cache coherent system unusable.

SUMMARY OF THE EMBODIMENTS

Various example systems and methods are disclosed in this specification. One example system includes a number of processors, where each processor includes a cache memory. Such a system may also include a number of directory controllers coupled to the processors, where each directory controller is configured to administer a corresponding cache coherency directory, each cache coherency directory is configured to track a corresponding set of memory addresses, and each processor is configured with information indicating the corresponding set of memory addresses tracked by each cache coherency directory. Such an example system may also include one or more components configured to identify a failure of one of the cache coherency directories and reassign the memory address set previously tracked by the failed cache coherency directory among the non-failed cache coherency directories. The one or more components may also be configured to reconfigure each processor with information describing the reassignment of the memory address set among the non-failed cache coherency directories.

Also disclosed in this specification are methods for use in a system, such as the system described above. Such methods may include: identifying a failure of one of the cache coherency directories. Such methods may also include reassigning the memory address set previously tracked by the failed cache coherency directory among the non-failed cache coherency directories. Such methods may also include reconfiguring each processor with information describing the reassignment of the memory address set among the non-failed cache coherency directories.

Figure 1:
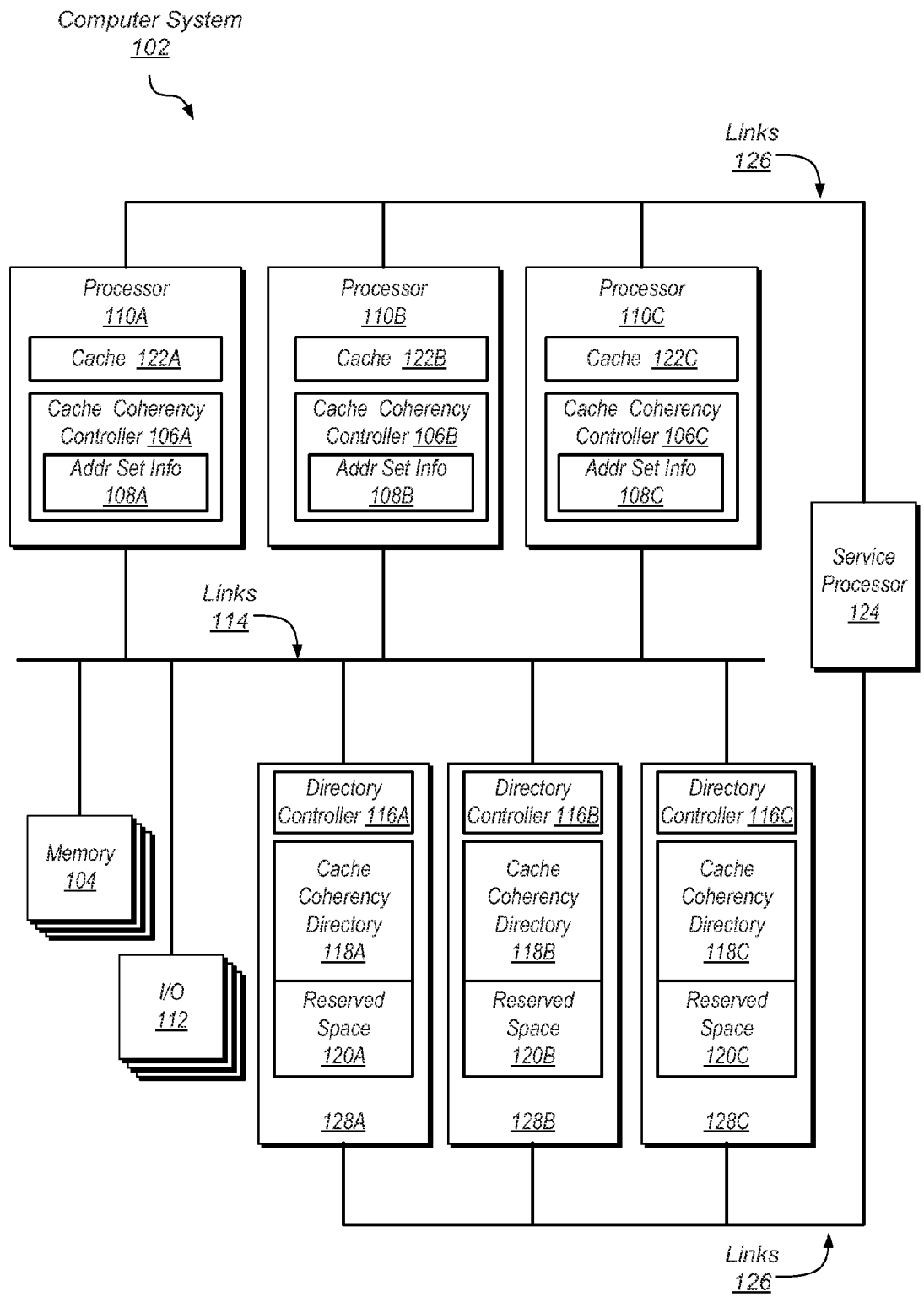
FIG. 1 sets forth a block diagram of one embodiment of computer system that includes a distributed cache coherency directory.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

FIG. 1 sets forth a block diagram of one embodiment of computer system that includes a distributed cache coherency directory, described below in further detail. The example computer system 102 of FIG. 1 also includes several processors 110A, 110B, and 110C, coupled to one or more I/O (input/output) blocks 112 and one or more memory blocks 104 through point-to-to point links 114, an internal bus, or some other data communications link. In some embodiments, each processor 110 may be coupled directly through a link not depicted in FIG. 1 to a separate memory 104 and a separate I/O block 112, while each processor 110 is coupled to all the memory 104 and I/O blocks 112 through the point-to-point links 114. Such a computer system 102 may be configured for use in various applications including, for example, as a mobile device, a personal desktop computer, a notebook or laptop computer, a server, and the like.

The example I/O block 112 of FIG. 1 may be configured to coordinate data transfer between the computer system 102 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, the I/O block 112 may be configured to implement a version of Universal Serial Bus (USB) protocol or IEEE 1394 (Firewire®) protocol.

The example I/O block 112 may also be configured to coordinate data transfer between the computer system 102 and one or more devices (e.g., other computer systems) coupled to the computer system 102 via a network. In some embodiments, the I/O block 112 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, the I/O block 112 may be configured to implement multiple discrete network interface ports.

The example memory block 104 of FIG. 1 may include any suitable type of memory, such as a Static Random Access Memory (SRAM), Dynamical Random Access Memory (DRAM), a Read-only Memory (ROM), Electrically Erasable Programmable Read-only Memory (EEPROM), or a FLASH memory, for example. It is noted that in the embodiment of a computer system illustrated in FIG. 1, a single memory block is depicted. In other embodiments, any suitable number of memory blocks may be employed.

The processors 110 may share the computer memory 104 and each may include a cache memory 122A, 122B, and 122C. The system of FIG. 1 may be configured for cache coherency. Cache coherency refers to the consistency of data stored in local caches of a shared resource, such as the memory 104. If, for example, a memory address is read into a cache line of a first processor's 110A local cache 122A then read into a second processor's 110B local cache 122B, any subsequent write to the memory address must be preceded by an invalidation of the corresponding cache line in all other processors. In this way, the other processors will not read the local version of the cache line which, after the write to the memory address, may include stale data. It is noted, that although an example of a real-time cache coherency protocol is described here, such protocol is an example only and other types of cache coherency protocols may be employed.

To effect cache coherency, each processor 110 may include a cache coherency controller 106A, 106B, 106C, with each cache coherency controller 106 including respective address set information 108A, 108B, and 108C. The system of FIG. 1 may employ a global cache coherency directory (shown in FIG. 1 as three global cache coherency directory portions, 118A, 118B, and 118C, referred to collectively herein as a "global cache coherency directory 118") that is administered by directory controllers 116A, 116B, 116C. The global cache coherency directory 118 may include entries representing each processor's 110 cache lines, the memory address associated with each cache line, status information related to coherency, and other information useful for supporting a cache coherency scheme. When a given processor, such as, for example, processor 110A, intends to read a memory address into a cache line or write to a memory address stored in a local cache, the processor's cache coherency controller 106A may request information from or inform the global cache coherency directory 118 through one of the directory controllers 116. A directory controller 116 is said to 'administer' a cache coherency directory in that the directory controller 116 maintains entries in the cache coherency directory 118 and also responds to requests from cache coherency controllers 106 based on information from the cache coherency directory.

In the example of FIG. 1, the cache coherency directory 118 is distributed among several components 128A, 128B, and 128C (referred to collectively herein as "components 128"), such that the global cache coherency directory 118 is separated into three portions, effectively three cache coherency directories 118A, 118B, and 118C. Each cache coherency directory 118A, 118B, 118C may be associated with a separate set of memory addresses. To that end, each directory controller 116A, 116B, and 116C is configured with information indicating the set of memory addresses associated with the cache coherency directory administered by the directory controller. Further, each cache coherency controller 106A, 106B, 106C is configured with information indicating the set of memory addresses associated with each cache coherency directory. In this way, each cache coherency controller 106 knows which cache coherency directory to target upon a cache line write or read based on the memory address of the write or read.

Upon one of the components 128 failing, the cache coherency directory may be corrupt or incomplete to the point that the cache coherency scheme cannot be continued. In systems of the prior art, upon such a failure of a cache coherency directory, a service call would be issued and the system 102 be taken offline until the failed component 128 was replaced. The system 102 of FIG. 1, however may be improved for redundancy in the instance of a component (or cache directory) failure. It is noted that a failure of a cache coherency directory may include a failure of the component that implements the directory, a failure of the directory itself, a failure of the directory controller configured to administer the directory, or an implied, inferred, or predicted failure evidenced from one or more tests, subpar operating characteristics, or anomalies in operation of any of the modules described above.

The system of FIG. 1 may be configured for cache coherency directory redundancy in various ways. The system of FIG. 1, for example, may include a service processor that is coupled through an out-of-band bus, a set of point-to-point links 126, or some other data communications link, to the processors 110A, 110B, and 110C as well as the directory components 128A, 128B, and 128C. A service processor is a processor of a system configured to monitor system components, control environmental characteristics, report system status, and so on, rather than executing primary operating system and application-level program instructions. Such service processors may be coupled to sensors, a system processor, I/O adapters, communication adapters, memory adapters, memory, and other components of the system through out-of-band means. Further, when power to the system is removed (the system is powered-down), the service processor may, in some instances, remain fully powered. In such a state, the service processor may be configured to program non-volatile memories, store data in processor registers, enable or disable various interrupt flags, and so on. In the example of FIG. 1, the service processor may also be configured to provide redundancy in instances of cache coherency directory failure.

In other embodiments, one of the processors may be selected or designated as a 'master' processor. Such a 'master' processor may be configured to carry out cache coherency directory redundancy operations as described below in further detail. It is noted that although either a service processor or master processor may be configured for administering such redundancy, the remainder of the description of FIG. 1 will describe the operations of a service processor 124.

The service processor 124 in the example of FIG. 1 may identify a failure of one of the cache coherency directories 118A, 118B, or 118C. As mentioned above, failure of a cache coherency directory may include a failure of any portion of the component 128 implementing the cache coherency directory 118. For example, a failure of a directory controller— such as, directory controller 116A—may be a failure of a cache coherency directory 118A because, from the perspective of the processors 110, the cache coherency directory 118A is no longer accessible or reliable through the directory controller 116A.

In some embodiments, the identification of a failure in one of the cache coherency directories 118 occurs as a result of encountering a fatal error in the cache coherency directory 118. Such a fatal error may cause the system to be powered down, 'crash,' or begin a rebooting process. In other embodiments, the identification of failure of one of the cache coherency directories 118 includes predicting the cache coherency directory failure by tracking operating characteristics of the cache coherency directories (and associated components) and determining that such operating characteristics do not meet acceptable criteria.

When identifying a failure of one of the cache coherency directories 118 includes predicting the cache coherency directory failure, rather than powering down the system, the service processor 124 may flush the non-failed cache coherency directories by flushing at least some of the cache memories in the system. In the system of FIG. 1, consider as an example, that cache coherency directory 118C fails. Upon the service processor 124 identifying the failure of the cache coherency directory 118C, the service processor may be configured to flush the cache coherency directories 118A and 118B (the non-failed directories). In one embodiment, the service processor 124 may flush the non-failed directories by flushing the cache of each processor 110. The service processor 124 in some embodiments may flush the processors' cache directly while in other embodiments, the service processor instructs the processors 110 to flush the caches 122. Such a flushing of cache memory will be propagated by each processor's 110 cache coherency controller 106 to the directory controllers 116, effectively informing each directory controller 116 that no memory addresses are stored in cache. Responsive to the information, each directory controller 116 will clear all entries in the cache coherency directory 118 administered by the directory controller 116.

The service processor 124 may reassign the memory address set tracked by the failed cache coherency directory among the non-failed cache coherency directories. In some embodiments, a portion of the memory address set previously tracked by the failed cache coherency directory may be assigned to each of the non-failed cache coherency directories for future tracking. That is, the memory address set tracked by the failed cache coherency directory may be redistributed among non-failed directories to be tracked by the non-failed directories. In other embodiments, all addresses (including those tracked by the failed cache coherency directory as well as those tracked by non-failed directories) are redistributed among all non-failed directories. In this way, it is possible that one or more of the non-failed directories are assigned unequal portions of the set of memory addresses tracked by the failed directory or no portion at all.

Upon the reassignment, one or more of the non-failed cache coherency directories will be configured to track some portion of the memory address set previously tracked by the failed cache coherency directory in addition to memory addresses previously tracked by the non-failed directories. That is, the non-failed directories, upon the reassignment, are configured to track the entire set of addresses tracked previously by all the directories prior to failure. Continuing with the above example and further considering that each of the three cache coherency directories is configured to track 100 memory addresses, upon a failure of the cache coherency directory 118C, the 100 memory addresses tracked by the failed directory 118C will be reassigned to the cache coherency directory 118A and 118B. Before the failure, therefore, the cache coherency directory 118A was configured to track 100 memory addresses and cache coherency directory 118B was configured to track a different 100 memory addresses. After the failure and reassignment by the service processor 124, the cache coherency directory 118A is configured to track 150 memory addresses and cache coherency directory 118B is configured to track a different 150 memory addresses. In the example of FIG. 1, each cache coherency directory 118A, 118B, and 118C may be configured with an additional amount of reserved space 120A, 120B, and 120C. The reserved space is memory space available to track a portion of one or more failed cache coherency directories' memory address set. In some embodiments, the reserved memory space may be configured to store at least:

$$\frac{M * X}{N - M} \text{ entries,}$$

where N is a number of cache coherency directories in the system, M is the greatest number of cache coherency directories that may fail while the system remains operational, and X is the number of entries each cache coherency directory is configured prior to any cache coherency directory failures in the system. N, the number of cache coherency directories in the system, may be design-specific and include any number of directories greater than two. X, likewise, may also be design specific and include any number greater than zero. N, may be user or designer specified number greater than zero. In this way in some embodiments, the cache coherency directories may include an amount of reserved space configured such that more than one cache coherency directory may fail and the system may be reconfigured. The term 'entries' here may be synonymous with 'cache coherency information related to a cache line address' in that each entry of a cache coherency directory may represent cache coherency information related to a cache line address. It is noted that these numbers are merely examples of one possible implementation among many. In other embodiments, the number of memory addresses tracked by each of the cache coherency directories may be a much larger power of 2.

This reassignment, however, may also be propagated to the processors so that each processor is informed of the address set tracked by each cache coherency directory after the reassignment. To that end, the service processor 124 may also reconfigure each processor 110A, 110B, and 110C with information describing the reassignment of the memory address set previously tracked by the failed cache coherency directory among the non-failed cache coherency directory. The service processor may provide such information by updating each address set information 108 utilized by the cache coherency controllers 106 to access the cache coherency directories.

In some embodiments, the service processor 124 may also reconstruct the non-failed cache coherency directories, after the reassignment and reconfiguration, based on state information stored in each processor's cache. In this way, operation of the system may continue without rebooting the system. In other embodiments in which a failure is predicted, the cache coherency directories may be rearranged without reference to the caches.

In the embodiments described above in which the system is powered down upon encountering a fatal error in one of the cache coherency directories 118, the system may be powered up after the reassignment of the failed cache coherency directory's previously tracked memory address set and the reconfiguration of the processors accordingly. Once powered up, the non-failed cache coherency directories may be utilized by the processors 110, to effect cache coherency for the same memory addresses space prior to the failure of the cache coherency directory.

In some embodiments, the failed cache coherency directory may be replaced with a fully functional component. In such an embodiment, the service processor 124 may reassign all memory address sets tracked by all cache coherency directories prior to the identification of the failure among the non-failed cache coherency directories and the replaced cache coherency directory and reconfigure each processor with information describing the reassignment of all the memory address sets among the non-failed cache coherency directories and the replaced cache coherency directory. That is, upon a replacement of the failed cache directory with a replacement directory, the caches may be flushed (such that no coherency directory holds any state information), the service processor may redistribute the entire set of memory addresses tracked by all cache coherency directories among all non-failed directories (including the replacement directory), provide the processors with updated information describing the redistribution of the memory addresses among the non-failed directories (including the replacement directory, and operation of the system may continue.

Figure 2:
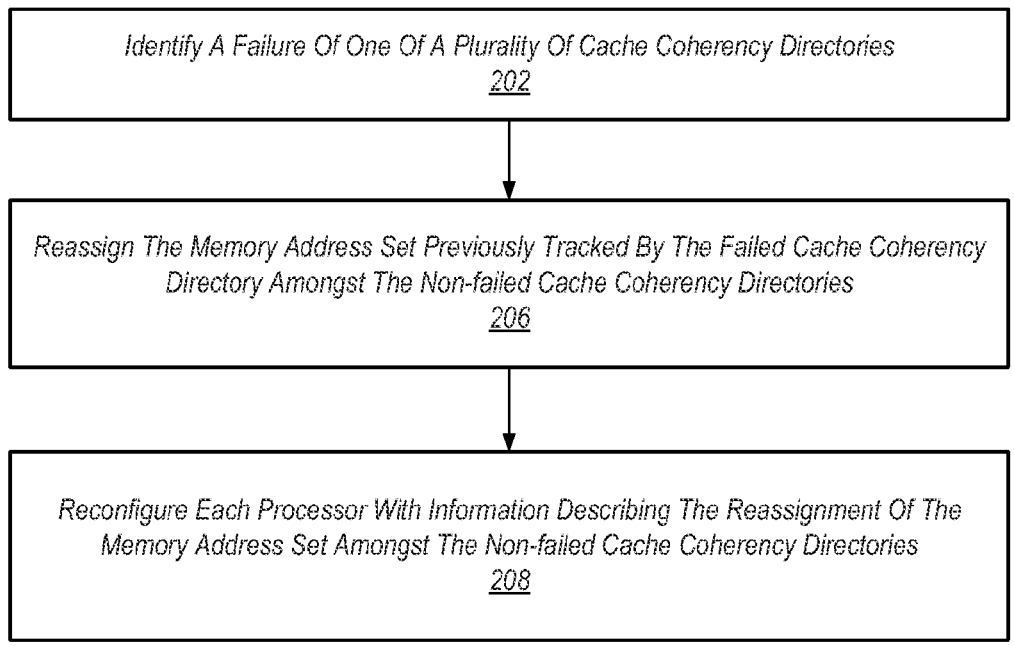
FIG. 2 sets forth a flow chart illustrating an example method of providing redundancy of cache coherency directories in a multi-processor, cache coherent system.

For further explanation, FIG. 2 sets forth a flow chart illustrating an example method of providing redundancy of cache coherency directories in a multi-processor, cache coherent system, such as the system set forth in the example of FIG. 1. The method of FIG. 2 includes identifying 202 a failure of one of the cache coherency directories. As explained below in further detail identifying 202 a failure of one of the cache coherency directories may be carried out in various ways including, for example, by encountering a fatal error in one of the cache coherency directories or by 'inferring' or 'predicting' a failure.

The method of FIG. 2 also includes reassigning 206 the memory address set previously tracked by the failed cache coherency directory among the non-failed cache coherency directories. Reassigning 206 the memory address set previously tracked by the failed cache coherency directory among the non-failed cache coherency directories may be carried out in various ways. In one embodiment, for example, the memory address set may be reassigned in equal (or nearly equal) portions among all non-failed cache coherency directories. In other embodiments, all memory address sets tracked by all cache coherency directories may be reassigned among the non-failed cache coherency directories. That is, the entire pool of memory addresses is reassigned among all non-failed cache coherency directories. In such embodiments, the set of memory addresses tracked by the failed cache coherency directory may be redistributed, in any size, to any number of the non-failed cache coherency directories. Also in such embodiments, each cache coherency directory may no longer track the same set of addresses tracked prior to the reassignment.

Consider, for example, a system such as that depicted in FIG. 1 that includes three cache coherency directories, each of which is configured (prior to a failure) to store 100 entries (cache line addresses). In the event of a cache coherency directory failure, the 100 entries previously tracked by the failed cache coherency directory may be, in some embodiments, reassigned in equal numbers (50 entries) among the remaining two cache coherency directories. In some embodiments, each cache coherency directory is configured with reserved memory space that includes:

$$\frac{M*X}{N-M} \text{ entries,}$$

where N is the number of cache coherency directories in the system, X is the number of entries each cache coherency directory is configured to track prior to any cache coherency directory failures in the system, and M is the greatest number of cache coherency directory failures that the system may endure and continue to operate the cache coherency scheme. Consider an example in which ten cache coherency directories each track 100 entries prior to a cache coherency directory failure. Consider, also, that the system is configured to endure two cache coherency directory failures. In such a system, the amount of reserved space required to track memory addresses previously tracked by failed cache coherency directories includes space for twenty five entries. That is, if two cache coherency directories fail, 200 entries will be reassigned among eight cache coherency directories at 25 entries per non-failed cache coherency directory. It is noted that these numbers are merely examples of one possible implementation among many. In other embodiments, the number of memory addresses tracked by each of the cache coherency directories may be a much larger power of 2.

The method of FIG. 2 also includes reconfiguring 208 each processor with information describing the reassignment of the memory address set among the non-failed cache coherency directories. Reconfiguring 208 each processor may be carried out by providing to each processor a notification indicating the removal of one cache coherency directory from the system and the 'new' memory address sets tracked by the remaining, non-failed, cache coherency directories. The 'new' memory address sets tracked by the non-failed cache coherency directories include the reassigned portions of the memory address set previously tracked by the failed cache coherency directory. It is noted that, the updated information may be stored in a predesignated register file (such as a register file accessible by a processor's cache coherency controller), provided via a data communications message, stored in a memory location accessible by all the processors and retrieved responsive to a notification of an update, and so on. Alternatively, a control register may be programmed with an identification of the failed cache coherency directory. Upon startup or resuming operations, each processor may inspect the programmed control register, and, knowing the reassignment techniques described above, update any necessary data structures, registers, and the like with new targets for cache coherency directory addresses.

Figure 3:
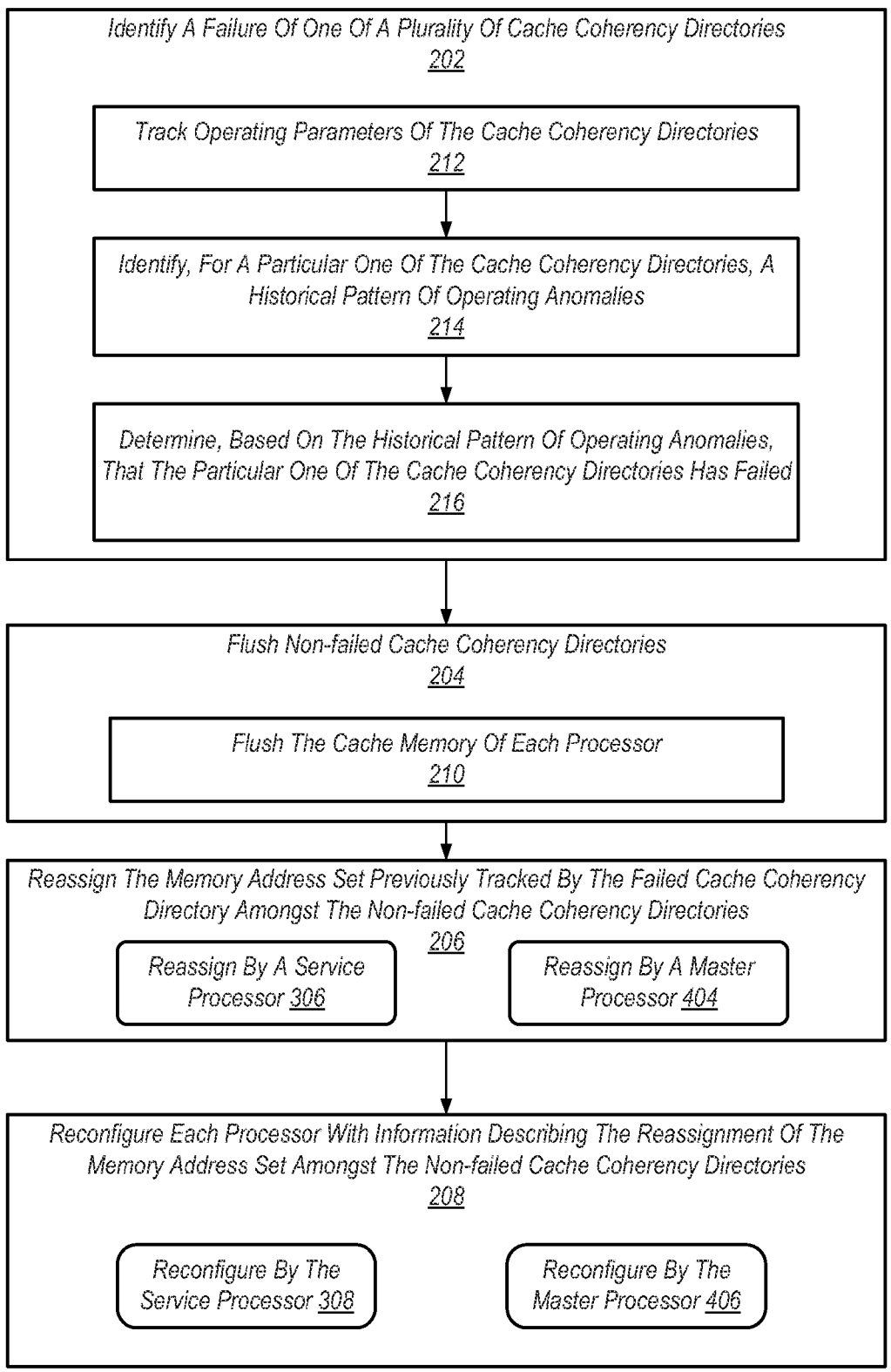
FIG. 3 sets forth a flow chart illustrating another example method of providing redundancy of cache coherency directories in a multi-processor, cache coherent system.

For further explanation, FIG. 3 sets forth a flow chart illustrating another example method of providing redundancy of cache coherency directories in a multi-processor, cache coherent system. The method of FIG. 3 is similar to the method of FIG. 2 in that the method of FIG. 3 may also be carried out in a system similar to that in the example of FIG. 1. Further, FIG. 3 includes identifying 202 a failure of one of the cache coherency directories, reassigning 206 the memory address set previously tracked by the failed cache coherency directory and reconfiguring 208 each processor with information describing the reassignment of the memory address set among the non-failed cache coherency directories.

The method of FIG. 3 differs from the method of FIG. 2, however, in that identifying 202, a failure of one of the cache coherency directories may be carried out by tracking 212 operating parameters of the cache coherency directories, identifying 214, for a particular one of the cache coherency directories, a historical pattern of operating anomalies, and determining 216, based on the historical pattern of operating anomalies, that the particular one of the cache coherency directories is likely to fail within a predetermined period of time. Consider, as an example of a historical pattern of operating anomalies, a cache coherency directory (or its associated directory controller) having a number of communication timeouts over a predefined period of time. In some embodiments, some historical patterns of communication timeouts (such as those patterns that includes a number of timeouts greater than a predefined threshold over the predefined period of time) may indicate that the component implementing the cache coherency directory or the directory controller is failing or is likely to fail. In this way, a failure may be 'inferred,' 'implied,' or 'predicted' as opposed to a complete and actual failure of a cache coherency directory. Another example of an operating anomaly from which a historical pattern may be formed to infer a failure of directory may include a rate of correctable errors in the cache coherency directory.

The method of FIG. 3 also includes flushing 204 the non-failed cache coherency directories. Flushing 204 the non-failed cache coherency directories may be carried out by flushing 210 at least some of the cache memories of the processors. Flushing 210 cache memory of a processor may be carried out in various ways including, for example, by sending, to the cache coherency controller (106 of FIG. 1, for example) of each processor, an instruction to invalidate all cache lines of the processor's cache. In other embodiments, the system may be placed in a quiescent state, and the cache coherency directory information may be rearranged before resuming operation.

Also in the method of FIG. 3, reassigning 206 the memory address set previously tracked by the failed cache coherency directory may be carried out by reassigning 306 the memory address set previously tracked by the failed cache coherency directory by a service processor. In other embodiments, reassigning 206 the memory address set previously tracked by the failed cache coherency directory may be carried out by reassigning 404 the memory address set by a master processor selected from the plurality of processors. In a similar manner in the method of FIG. 3, reconfiguring 208 each processor with information describing the reassignment may include reconfiguring 308 each processor by the service processor or reconfiguring 406 each processor by the master processor.

Figure 4:
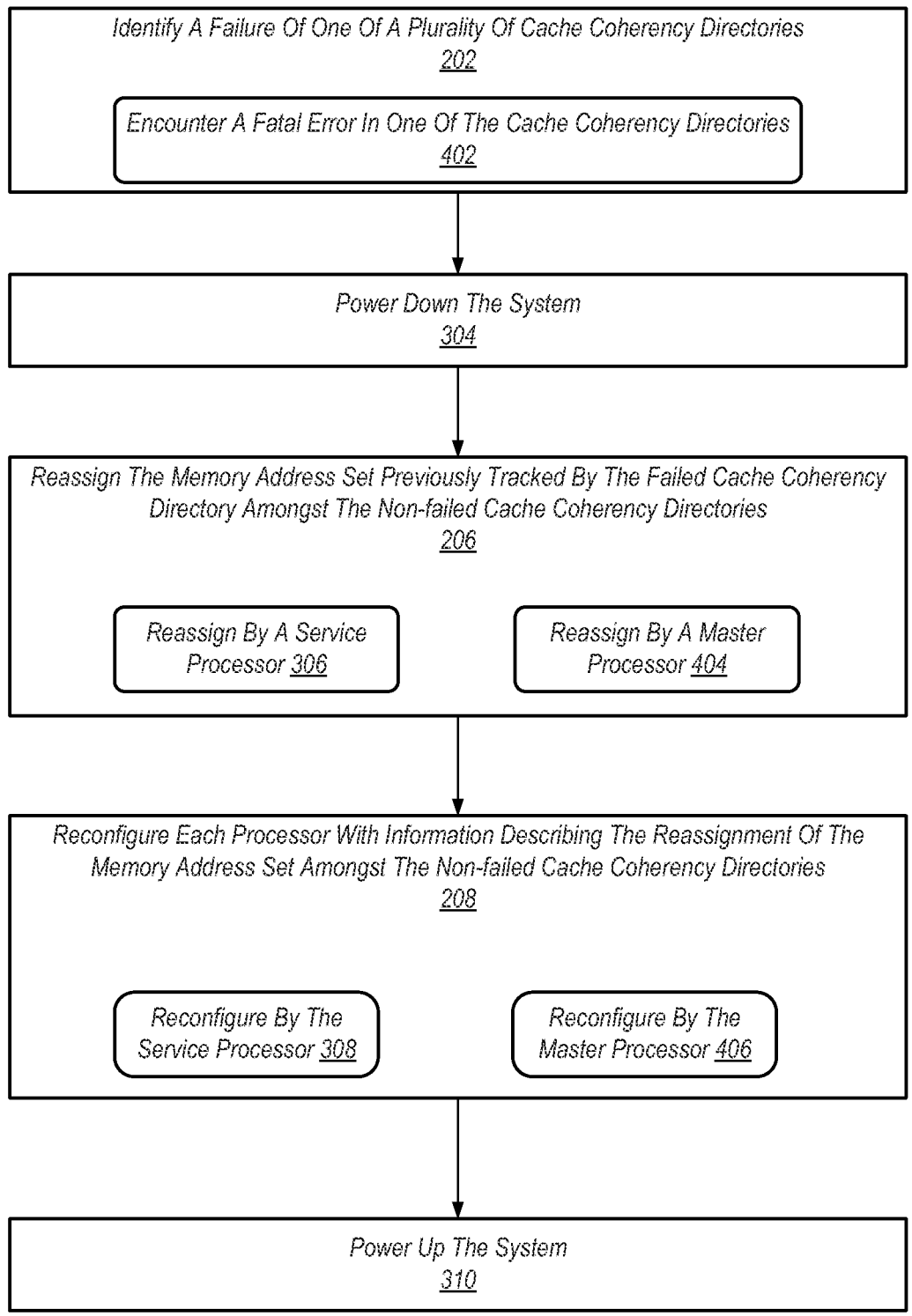
FIG. 4 sets forth a flow chart illustrating another example method of providing redundancy of cache coherency directories in a multi-processor, cache coherent system.

For further explanation, FIG. 4 sets forth a flow chart illustrating another example method of providing redundancy of cache coherency directories in a multi-processor, cache coherent system. The method of FIG. 4 is similar to the method of FIG. 2 in that the method of FIG. 4 may be carried out in a system similar to that described above with respect to FIG. 1 and may also include: identifying 202 a failure of one of the cache coherency directories; reassigning 206 the memory address set previously tracked by the failed cache coherency directory among the non-failed cache coherency directories; and reconfiguring 208 each processor with information describing the reassignment of the memory address set among the non-failed cache coherency directories.

The method of FIG. 4 differs from the method of FIG. 2, however, in that identifying a failure of one of the cache coherency directories in the method of FIG. 4 includes encountering 402 a fatal error in one of the cache coherency directories. That is, rather than predicting an error as described in FIG. 3, an error is actually encountered in the example of FIG. 4.

FIG. 4 also includes powering 304 down the system after encountering 402 the fatal error. In some embodiments, the power down may be a 'crash' rather than a graceful exit of operations. In powering down, cache memory data and thus state is lost.

Also in the method of FIG. 4, reassigning 206 the memory address set previously tracked by the failed cache coherency directory may be carried out by reassigning 306 the memory address set previously tracked by the failed cache coherency directory by a service processor. That is, once the system is powered 304 down, a service processor (which may be part of the system itself or a component external to the system) may reassign the memory address set of the failed cache coherency directory among the non-failed directories. In other embodiments, reassigning 206 the memory address set previously tracked by the failed cache coherency directory may be carried out by reassigning 404 the memory address set by a master processor selected from the plurality of processors.

In a similar manner in the method of FIG. 4, reconfiguring 208 each processor with information describing the reassignment may include reconfiguring 308 each processor by the service processor or reconfiguring 406 each processor by the master processor. After the reassignment 206 and the reconfiguration 208 of the processors, the system may be powered 310 up.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a plurality of processors, wherein each processor includes a cache memory;
    a plurality of directory controllers coupled to the plurality of processors, wherein each directory controller is configured to administer a corresponding cache coherency directory, each cache coherency directory is configured to track a corresponding set of memory addresses, and each processor is configured with information indicating the corresponding set of memory addresses tracked by each cache coherency directory; and
    one or more components configured to:
        identify a failure of one of the cache coherency directories;
        reassign the memory address set previously tracked by the failed cache coherency directory among the non-failed cache coherency directories;
        reconfigure each processor with information describing the reassignment of the memory address set among the non-failed cache coherency directories;
        and flush, responsive to identifying the failure, the remaining non-failed cache coherency directories prior to reassigning the memory address set previously tracked by the failed cache coherency directory.

2. The system of claim 1 wherein the one or more components are configured to:
    identify a failure of one of the cache coherency directories by:
        tracking operating parameters of the cache coherency directories;
        identifying, for a particular one of the cache coherency directories, a historical pattern of operating anomalies; and
        determining, based on the historical pattern of operating anomalies, that the particular one of the cache coherency directories has failed.

3. The system of claim 2 wherein the one or more components configured to reassign and to reconfigure comprise a service processor coupled to the processors configured to flush the non-failed cache coherency directories by flushing the cache of all processors.

4. The system of claim 1 wherein:
the one or more components are configured to identify a failure of one of the cache coherency directories by:
encountering a fatal error in one of the cache coherency directories; and
the system further comprises one or more components configured to:
power down the system responsive to encountering the fatal error; and
power up the system after the reassignment and reconfiguration.

5. The system of claim 1 wherein:
the system includes N cache coherency directories, wherein N corresponds to an integer greater than two;
the system is configured to remain operational with no more than M number of failed cache coherency directories, wherein M is the greatest number of cache coherency directories that may fail while the system remains operational;
each cache coherency directory, prior to any cache coherency directory failures, is configured to track X number of entries, wherein X corresponds to an integer greater than zero; and
each cache coherency directory includes an amount of reserved memory space configured to store, upon a cache coherency directory failure, at least:

$$\frac{M*X}{N-M} \text{ entries.}$$

6. The system of claim 1 wherein the one or more components configured to reassign and to reconfigure comprise a master processor selected from the plurality of processors.

7. The system of claim 1 wherein the one or more components configured to reassign and to reconfigure comprise a service processor coupled to the processors by one or more out-of-band data communication links.

8. The system of claim 1 further comprising one or more components configured to:
replace the failed cache coherency directory;
reassign all memory address sets tracked by all cache coherency directories prior to the identification of the failure among the non-failed cache coherency directories and the replaced cache coherency directory; and
reconfigure each processor with information describing the reassignment of all the memory address sets among the non-failed cache coherency directories and the replaced cache coherency directory.

9. The system of claim 8 further comprising one or more components configured to:
power down the system prior to the reassignment of all memory address sets and the reconfiguration of each processor with information describing the reassignment of all the memory address sets; and
power up the system after the reassignment of all memory address sets and the reconfiguration of each processor with information describing the reassignment of all the memory address sets.

10. The system of claim 8 further comprising one or more components configured to:
flush all caches in the system prior to the reassignment of all memory address sets and the reconfiguration of each processor with information describing the reassignment of all the memory address sets; and
continue operation with the non-failed and replaced cache coherency directories without rebooting the system.

11. The system of claim 8, wherein the one or more components configured to reassign all the memory address sets and reconfigure each processor with information describing the reassignment of all the memory address sets comprise a master processor selected from the plurality of processors.

12. The system of claim 8, wherein the one or more components configured to reassign all the memory address sets and reconfigure each processor with information describing the reassignment of all the memory address sets comprise a service processor coupled to the processors by one or more out-of-band data communication links.

13. The system of claim 1 wherein an aggregation of the plurality of cache coherency directories comprises a global cache coherency directory configured to track all memory addresses that are coherent among the processors.

14. The system of claim 1 wherein the one or more components are further configured to reconstruct the non-failed cache coherency directories, after the reassignment and reconfiguration, from state information stored in each processor's cache and continue operation of the system without rebooting the system.

15. A method comprising:
identifying a failure of one of a plurality of cache coherency directories in a system, wherein the plurality of cache coherency directories is coupled to a plurality of processors in the system, wherein each processor includes a cache memory, wherein each cache coherency directory is configured to track a corresponding set of memory addresses for cache coherency status, and wherein each processor is configured with information indicating the corresponding set of memory addresses tracked by each cache coherency directory;
reassigning the memory address set previously tracked by the failed cache coherency directory among the non-failed cache coherency directories;
reconfiguring each processor with information describing the reassignment of the memory address set among the non-failed cache coherency directories;
and flush, responsive to identifying the failure, the remaining non-failed cache coherency directories prior to reassigning the memory address set previously tracked by the failed cache coherency directory.

16. The method of claim 15, wherein identifying a failure of one of the cache coherency directories further comprises:
tracking operating parameters of the cache coherency directories;
identifying, for a particular one of the cache coherency directories, a historical pattern of operating anomalies; and
determining, based on the historical pattern of operating anomalies, that the particular one of the cache coherency directories has failed.

17. The method of claim 16 wherein flushing the cache coherency directories further comprises flushing the cache of one or more processors.

18. The method of claim 15 wherein identifying a failure of one of the cache coherency directories further comprises encountering a fatal error in one of the cache coherency directories;
powering down the system responsive to encountering the fatal error; and after the reassigning and the reconfiguring are carried out, powering up the system.

19. The method of claim 15 wherein:

the system includes N cache coherency directories;

the system is configured to remain operational with no more than M number of failed cache coherency directories;

each cache coherency directory is configured, prior to any cache coherency directory failures in the system, to track X number of entries; and each cache coherency directory includes an amount of reserved memory space configured to store, upon a cache coherency directory failure, at least:

$$\frac{M*X}{N-M} \text{ entries.}$$

20. The method of claim 15 further comprising:

replacing the failed cache coherency directory;

reassigning all memory address sets tracked by all cache coherency directories prior to the identification of the failure among the non-failed cache coherency directories and the replaced cache coherency directory; and reconfiguring each processor with information describing the reassignment of all the memory address sets among the non-failed cache coherency directories and the replaced cache coherency directory.

* * * * *

UNITED STATES PATENT AND TRADEMARK OFFICE
CERTIFICATE OF CORRECTION

| | | |
|---|---|---|
| PATENT NO. | : 9,135,175 B2 | Page 1 of 1 |
| APPLICATION NO. | : 13/758491 | |
| DATED | : September 15, 2015 | |
| INVENTOR(S) | : Wicki et al. | |

It is certified that error appears in the above-identified patent and that said Letters Patent is hereby corrected as shown below:

On the title page

Item [71], delete "Coporation," and insert -- Corporation, --, therefor.

Item [56], page 2, column 1, line 1, delete ""Characterisitics" and insert -- "Characteristics --, therefor.

Signed and Sealed this
Twenty-fourth Day of May, 2016

Michelle K. Lee
*Director of the United States Patent and Trademark Office*